United States Patent [19]

Dennany Jr.

[11] Patent Number: 4,915,421
[45] Date of Patent: Apr. 10, 1990

[54] QUICK CONNECTOR ASSEMBLY

[75] Inventor: Robert D. Dennany Jr., Lapeer, Mich.

[73] Assignee: ITT Corporation, New York, N.Y.

[21] Appl. No.: 175,005

[22] Filed: Mar. 30, 1988

[51] Int. Cl.$^4$ ............................................. F16L 37/12
[52] U.S. Cl. ..................... 285/39; 285/319; 285/921
[58] Field of Search ............... 285/319, 39, 362, 377, 285/921, 340

[56] References Cited

U.S. PATENT DOCUMENTS

| | | | |
|---|---|---|---|
| 2,129,704 | 9/1938 | Meyer | 285/377 X |
| 2,188,515 | 1/1940 | Noble | 285/362 X |
| 2,631,872 | 3/1953 | Wurmser | 285/39 X |
| 2,950,132 | 8/1960 | Kocsuta | 285/340 |
| 3,569,903 | 3/1971 | Brishka | 339/74 |
| 3,888,523 | 6/1975 | Bartholomew | 285/382 |
| 3,997,195 | 12/1976 | Bartholomew | 285/81 |
| 4,021,062 | 5/1977 | Mariaulle | 285/39 |
| 4,161,061 | 7/1979 | Mason et al. | 29/566.4 |
| 4,310,185 | 1/1982 | Bartholomew | 285/369 |
| 4,423,892 | 1/1984 | Bartholomew | 285/319 |
| 4,508,234 | 4/1985 | Bartholomew | 215/206 |
| 4,508,369 | 4/1985 | Mode | 285/39 |
| 4,524,995 | 6/1985 | Bartholomew | 285/54 |
| 4,526,411 | 7/1985 | Bartholomew | 285/305 |
| 4,541,658 | 9/1985 | Bartholomew | 285/319 |
| 4,601,497 | 7/1986 | Bartholomew | 285/319 |
| 4,630,848 | 12/1986 | Twist et al. | 285/308 |
| 4,647,082 | 3/1987 | Fournier et al. | 285/315 |
| 4,691,943 | 9/1987 | DeLand et al. | 285/315 |
| 4,711,472 | 12/1987 | Schnell | 285/162 |
| 4,749,214 | 6/1988 | Hoskins | 285/39 X |
| 4,753,458 | 6/1988 | Case et al. | 285/319 |
| 4,778,203 | 10/1988 | Bartholomew | 285/921 X |
| 4,781,400 | 11/1988 | Cunningham | 285/319 X |

FOREIGN PATENT DOCUMENTS

| | | | |
|---|---|---|---|
| 2307154 | 8/1974 | Fed. Rep. of Germany | 285/319 |
| 281086 | 9/1970 | U.S.S.R. | 285/319 |

*Primary Examiner*—Thomas F. Callaghan
*Attorney, Agent, or Firm*—Robert P. Seitter

[57] ABSTRACT

A connector for connecting the confronting ends of tubing sections. The connector includes a connector body having an opening therein which extends therethrough along a longitudinal axis of the housing. The housing includes as first end for connection to the confronting end of a first tubing section. A first annular chamber is provided in the housing between the first end and the second end of the housing for receiving a generally annular seal therein which sealingly engages a second tubing section. A generally cylindrical retaining clip is provided in the housing between the seal and the second end of the housing. The clip includes a pair of diametrically opposed portions thereon which are radially deflectable relative to the axis of the housing. The ends of the retaining portions engage a radially outwardly flange portion of the second tubing section when the second tubing section is inserted into the body to deflect the retaining portion radially outwardly until the flange is inserted between the end of the retaining portion and the seal. A retaining cap is provided for enclosing the second end and includes an opening therein coaxial with the axis for receiving the inserted end of the second tubing section.

3 Claims, 2 Drawing Sheets

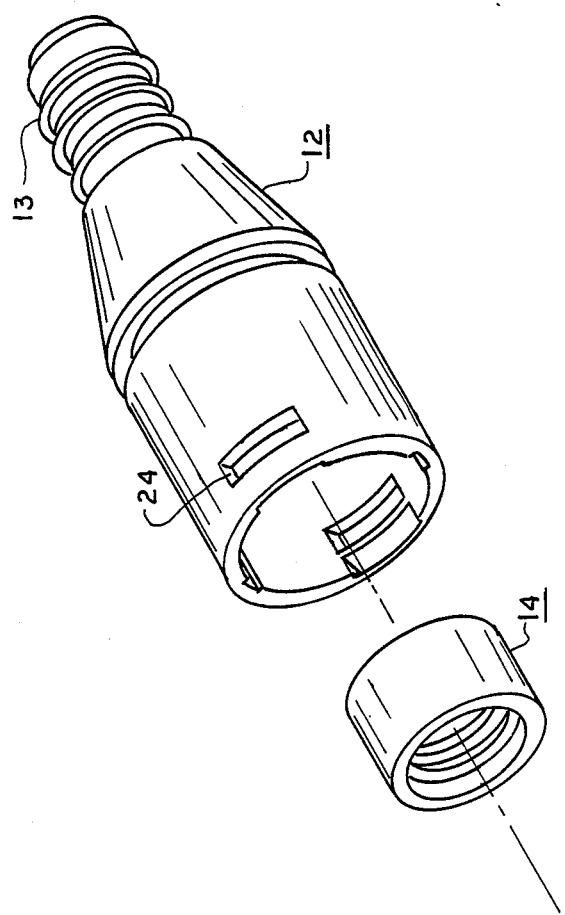
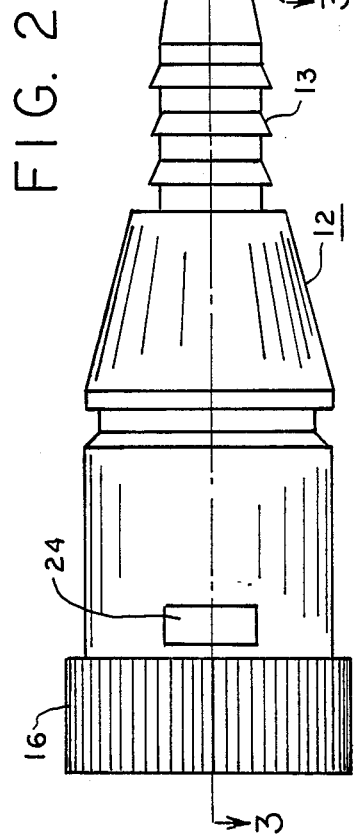
FIG. 1
FIG. 2

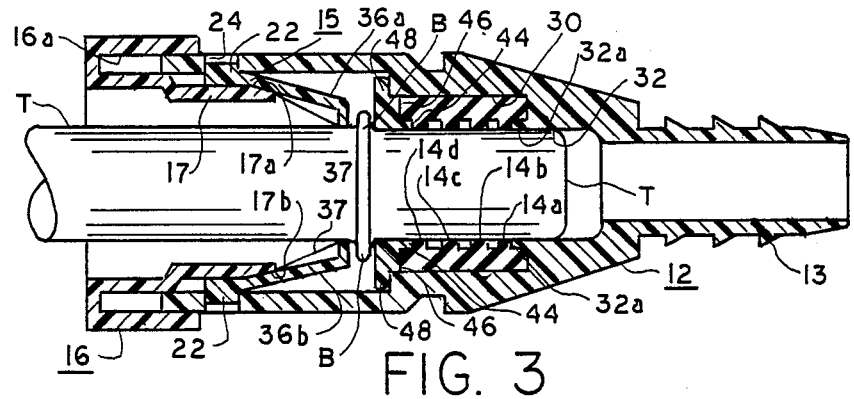
FIG. 3
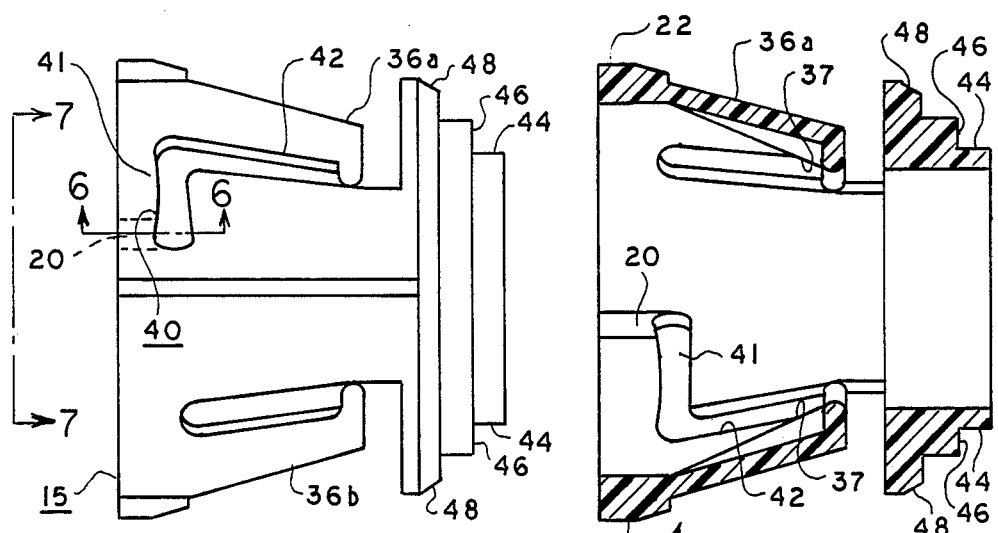
FIG. 4
FIG. 5
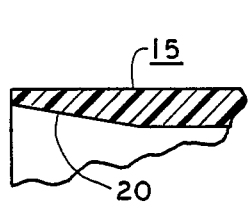
FIG. 6
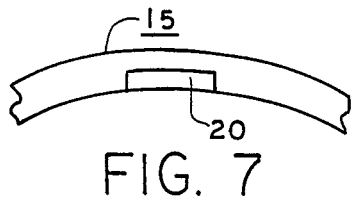
FIG. 7

QUICK CONNECTOR ASSEMBLY

BACKGROUND OF THE INVENTION

This invention relates to a connector for connecting the confronting ends of tubular or tubing sections and, more particularly, to such a connector for connecting the tubing in snap-in relationship therewith.

Connectors for connecting tubing and tubular conduits are known and have been widely used in the art. Such connectors are exemplified in U.S. Pat. Nos. 4,423,892; 4,310,185; and 4,601,497. These connectors are utilized in the automotive industry, as well as many other industries to provide low-cost, reliable and easy to assemble systems. These connectors are typically utilized to provide fluid carrying conduits in fuel and refrigerant lines. These connectors have the disadvantages that a relatively large number of connector components are required and substantial assembly time is required in screwing the assembly cap to a fitting and tightening the cap to the proper torque to accomplish the desired fluid seal. Further, a substantial inventory has been required in order to maintain the required number of sealing caps and fittings to provide the desired fitting to meet the needs of given applications. Further, problems have been presented when retightening the caps to maintain the seal after the automobile or other system has been serviced. Another connector has been suggested which provides a snap-in connection of a tubing end which is retained within the connector housing by means of resilient metallic fingers. However, this connector has the disadvantages that a large number of connector components are required and that a special tool is required to remove the connected tubing from the connector housing.

These and other disadvantages are overcome by the present invention wherein a connector is provided for connecting tubing sections while providing a connector assembly requiring fewer components and which is easily assembled and which may be serviced by opening and reconnecting the assembly. The connector of the present invention includes means for maintaining the seal after the automobile or other system has been put in use and serviced.

SUMMARY OF THE INVENTION

Briefly a connector for connecting the confronting ends of tubing sections is provided. The connector comprises a connector housing having an opening therein and extending therethrough along a longitudinal axis of the housing. The housing includes a first end for terminating said housing into a connection. A first annular chamber is provided in the housing between the first end and the second end of the housing for receiving a generally annular seal therein which sealingly engages a tubing section. A generally cylindrical retaining clip is provided in the housing between the seal and the second end of the housing. The clip includes at least one flexible retaining portion thereon which is radially deflectable relative to the axis of the housing. The deflected end of the retaining portion engages a radially outwardly flange portion of the tubing section when the tubing section is inserted into the body to deflect the retaining portion radially outwardly until the flange is inserted between the end of the retaining portion and the seal. A retaining cap is provided for enclosing the second end and includes an opening therein coaxial with the axis for receiving the inserted end of the tubing section.

BRIEF DESCRIPTION OF THE DRAWING

The advantages of this invention will become more readily appreciated as the same becomes completely understood by reference to the following detailed description when taken in conjunction with the accompanying drawing wherein:

FIG. 1 is an exploded view of the quick connector assembly in accordance with the principles of the present invention;

FIG. 2 is a plan view of the assembled quick connector assembly of FIG. 1;

FIG. 3 is a cross-sectional view of FIG. 2 taken along the line 3—3 of FIG. 2;

FIG. 4 is a plan view of the retaining clip of the device of the previous drawing figures;

FIG. 5 is a cross-sectional view of the retaining clip of FIG. 4;

FIG. 6 is a partial cross-sectional view of a portion of the retaining clip taken along the line 6—6 of FIG. 4; and FIG. 7 is a partial view of the retaining clip along the line 7—7 of FIG. 4.

DETAILED DESCRIPTION

Referring now to FIG. 1, there is shown generally at 10 a quick connector assembly in accordance with the principles of the present invention. Assembly 10 includes a connector body or housing 12 which accommodates an elastomeric cylindrical sealing member 14 which is retained within housing 12. Housing 12 further accommodates a retaining clip 15 which is retained within housing 12 as will be explained more fully hereinafter. Finally, assembly 10 is closed by means of a retaining cap 16 which includes a tubular inner end 17 which extends into housing 12. Retaining cap 16 further includes a pair of diametrically opposed protuberances 18 on opposite sides thereof which removably secure retaining cap 16 within housing 12. Protuberances 18 are received within notches 20 of retaining clip 15 and retaining clip 15 includes opposed raised portions 22 which respectively are received within openings 24 of housing 12 as will be explained more fully hereinafter. The forward end of housing 12 includes a ribbed or barbed projecting portion 13 for uniting connector 10 to the confronting end of an associated tubing section. It will be appreciated by those skilled in the art that the forward end of housing 12 can be provided in any desired configuration to meet the needs of any given connection. For example, the forward end can be provided as a threaded member which engages a corresponding movable or stationary threaded member.

Referring now to FIG. 2, there is shown a plan view of the connector assembly 10 of FIG. 1. It can be seen that retaining cap 16 is coupled to housing 12 and which thereby constrains seal 14 and retaining member 15 therein. The assembled device provides a unitary structure for coupling projecting portion 13 and connector 12 between the confronting ends of a pair of tubing sections as will be explained more fully hereinafter. As best illustrated in FIG. 3 which is a cross-sectional view taken along the line 3—3 of FIG. 2, housing 12 includes a first chamber 30 for receiving seal 14 therein. In FIG. 3, connector 10 is illustrated in conjunction with a section of tubing or tubular conduit T which includes a first bead portion B. The forward end of tubing T is received within an annular portion 32 of housing 12 to accommodate any overlapping of tubing T in housing 12. The seal between tubing T and housing 12 is provided by radially inwardly directed ribs 14a–14d of seal 14. In currently preferred practice, seal 14 includes four such inwardly directed ribs or protuberances 14a–14d. The inner end of annular portion 32 includes an annular ring 32a which sealingly engages and penetrates into seal 14 and which functions at high fluid pressures to prevent fluid from escaping around the outside diameter of said 14.

It can be seen that in the assembled configuration retaining clip 15 includes a pair of radially inwardly directed resilient arms 36a and 36b which comprise arcuate surface portions of the generally tubular and cylindrical retaining clip 15. It should now be appreciated that retaining clip 15 is mounted within openings 24 of housing 12 by means of the radially outwardly directed portions 22 of retaining clip 15. It also can be seen by reference to FIG. 3 that retaining cap 16 is slidably and rotatably mounted to housing 12 by means of longitudinally extending recesses 16a which receive the walls of the rearward generally tubular end of housing 12.

In the operation of the connector in accordance with the principles of the present invention, the leading end of tubing T is advanced through the housing, after retaining cap 16 has been assembly therein, and until the radially deflectable projections 36a and 36b are deflected outwardly to permit the advancing tubular section T to be inserted into housing 12. After tubing T essentially is inserted fully into housing 12, deflectable sections 36a and 36b snap back into the positions behind bead B as illustrated in FIG. 3. The trailing end of the flange or bead B then engages the ends of deflectable projections 36a and 36b. At that point, tubing section T is trapped within housing 12 and the leading portion of tubing section T is in sealing engagement with the protruding ribs 14a–14d of seal 14. Again, chamber 32 accommodates any overlapping of tubular section T within housing 12.

Referring now to FIG. 4 there is shown a plan view of the retaining clip 15 of the previous drawing figures. FIG. 5 is a vertical cross-sectional view of FIG. 4 taken along the plane of the drawing of FIG. 4. It can be seen that retaining clip 15 includes L-shaped portions shown generally at 40 and which are disposed at opposite radial surfaces of retaining clip 15 and which include a first leg portion 41 and a second leg portion 42. L-shaped portions 40 open into the rearward end of housing 12 by means of notches 20 as previously described. The protuberances 18 of retaining cap 16 initially respectively engage notch portions 20 as retaining cap 16 is advanced into housing 12. Once protuberances 18 reside within legs 41 in the assembled connector 10, the deflectable projections 36a and 36b of retaining clip 15 remain in the position wherein tubing section T is captured within housing 12. If, however, retaining cap 16 is rotated so that projections 18 can be advanced into legs 42 of retaining clip 15, further advancement of retaining cap 16 in the longitudinal direction into housing 12 permits the flexible legs of retaining clip 14 to be deflected radially outwardly by surfaces 17a and 17b of tubular inner end 17 of retaining cap 16 thereby to permit the flange or bead of tubing T to pass under the inwardly projecting portions of projections 36a and 36b so as to permit removal of tubing section T. Thus, the removal of tubing section T can be accomplished by rotating retaining cap 16 in a counterclockwise direction and then inserting retaining cap 16 axially inwardly into the housing 12 thereby to cam and radially outwardly deflect projections 36a and 36b of clip 15.

Still referring to FIGS. 4 and 5, it can be seen that retaining clip 15 includes an annular ring 44 which penetrates into and sealingly engages seal 14. Retaining clip 15 further includes an annular stepped portion 46 which holds seal 14 in its location in chamber 30 under a compressive load. Retaining clip 15 includes an alignment ring 48 for guiding and aligning retaining clip 15 within housing 12. Retaining clip 15 further includes a pair of ribs 37 located on each of projections 36a and 36b as illustrated in FIG. 5. Ribs 37 are radially inwardly directed from the circumferential end portions of projections 36a and 36b. Ribs 37 provide a smoother and lower force insertion of tubing section T into housing 12. Ribs 37 also function as springs which force retaining cap 16 back out of housing 12 when retaining cap 16 is rotated to release tubing section T from housing 12. It will be appreciated by those skilled in the art that the additional spring function provided by ribs 37 eliminates the need for a separate spring which otherwise would be required.

As illustrated in FIGS. 6 and 7, notch 20 is suitably tapered and sized so as to permit the initial insertion of retaining cap 16 with projections 18 thereon into clip 15 within housing 12. Clip 15, in turn, is secured within housing 12 by way of portions 22 which snap into openings 24 of the resilient walls of housing 12.

It will now be appreciated by those skilled in the art that surfaces 17a and 17b of tubular inner end 17 of retaining cap 16 engage and cam projections 36a and 36b radially outwardly to release or permit removal of tubing T, while projections 18 of retaining cap 16 guide tubular end 17 into housing 12 by way of L-shaped portions 40. Further, when projections 18 are rotated into the circumferentially extending legs of L-shaped portions 40, retaining cap 16 and therefore connector 10 is locked so as to preclude the release or removal of tubing T from connector 10.

It will also be appreciated by those skilled in the art that the preferred embodiment of the connector in accordance with the present invention requires only four basic components. Further, the use of an annular seal having a plurality of radially inwardly directed and axially spaced ribs or lips, in accordance with the present invention, eliminates the prior art need for multiple O-rings which are separated by spacers. The one-piece seal feature in accordance with the present invention has the further advantage that as the tubing section is inserted therein the tubing section only overcomes one lip at a time. Accordingly, the required insertion force of the tubing section is less than the force required to overcome the multiple O-ring configurations of the prior art connectors. This is because multiple O-rings introduce multiple insertion drag factors wherein the individual drag of each O-ring is cumulatively added to the drag or drags of the other O-rings. In contrast thereto, the ribs or lips of the elongated seal in accordance with the present invention are overcome one lip at a time and the individual deflected lips provide the required seal without cumulatively contributing to the insertion drag. It has also been found that four ribs or lips provide an optimum seal.

Connector assembly 10 in accordance with the present invention is preferably made of a plastic material such as Nylon. The material of connector assembly 10 may also comprise a metallic, an elastomeric or any other suitable material. Seal 14, however, preferably comprises an elastomeric material such as, for example, Flourosilicone. Further tubing sections T may comprise a metallic, rubber, or plastic material.

What has been taught, then, is a quick connector assembly and which overcomes the disadvantages of the prior art facilitating, notably, a connector assembly having a minimum number of components relative to the prior art devices. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A connector for connecting the ends of tubing sections, said connector comprising in combination:

a connector housing having an opening therein and extending therethrough along a longitudinal axis of said housing, said housing having a first end for connection to a first tubing section;

a first chamber in said housing between said first end and the second end of said housing for receiving a generally annular seal therein which sealingly engages a second tubing section;

a generally tubular retaining clip in said housing between said seal and said second end of said housing, said clip having at least one flexible retaining portion thereon which is radially deflectable relative to said axis and wherein the deflected end of said retaining portion engages a radially outwardly directed flange portion of said second tubing section when said second tubing section is inserted into said housing and said retaining portion is deflected radially outwardly until said flange is inserted between said end of said retaining portion and said seal;

means for retaining said clip in said housing to limit the axially inward position of said end of said retaining portion to a predetermined distance from said seal along the direction of said axis; and, a retaining cap for enclosing said second end and having an opening therein coaxial with said axis for receiving the inserted end of said second tubing section, wherein the surface of said housing includes at least one notch therein for receiving a radially outwardly projection of said retaining clip for retaining said clip in said housing, wherein said connector includes projections on said retaining cap which are slidably received in corresponding radially inwardly facing notches in said clip for releasably retaining said retaining cap in said housing, and wherein said notches in said retaining clip are generally L-shaped thereby to deflect said retaining portion radially outwardly when said retaining cap is inserted into said housing along one leg of said L-shaped notch and to lock said projections when said projections are rotated into the other leg of said L-shaped notch.

2. The connector according to claim 1, wherein said L-shaped notches are provided in said retaining clip substantially along diametrically opposed end surfaces of said retaining clip.

3. The connector according to claim 1, wherein an insertion notch is provided on the radially inwardly facing wall of said retaining clip adjacent each L-shaped portion for guiding said projections of said retaining cap into said L-shaped portions during the initial assembly of said connector.

* * * * *